(12) United States Patent
Yamamoto et al.

(10) Patent No.: US 6,916,563 B2
(45) Date of Patent: Jul. 12, 2005

(54) DISCHARGED FUEL DILUTER AND DISCHARGED FUEL DILUTION-TYPE FUEL CELL SYSTEM

(75) Inventors: Akio Yamamoto, Saitama (JP); Satoshi Aoyagi, Saitama (JP); Masami Ogura, Saitama (JP); Yoshikazu Murakami, Saitama (JP); Kazunori Fukuma, Saitama (JP); Takatsugu Koyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 146 days.

(21) Appl. No.: 10/278,260

(22) Filed: Oct. 23, 2002

(65) Prior Publication Data

US 2003/0077488 A1 Apr. 24, 2003

(30) Foreign Application Priority Data

Oct. 23, 2001 (JP) ........................................ 2001-325172

(51) Int. Cl.⁷ .............................. H01M 8/04; H01M 2/00
(52) U.S. Cl. .............................. 429/17; 429/19; 429/39; 429/34; 429/38
(58) Field of Search ............................... 429/17, 19, 39, 429/34, 38

(56) References Cited

U.S. PATENT DOCUMENTS 6,426,158 B1 * 7/2002 Pratt et al. .................... 429/13

FOREIGN PATENT DOCUMENTS

JP 2000-357530 12/2000

* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

A discharged fuel diluter includes: a retention region with a predetermined volume, into which a fuel discharged from a fuel cell is retained at the time of purging; a dilution region with a predetermined volume, through which air discharged from the fuel cell flows and at which the air is mixed with the fuel from the retention region to dilute the fuel; and a communicating portion, through which the fuel flows from the retention region to the dilution region.

21 Claims, 8 Drawing Sheets

NORMAL STATE

FIG.5B

INSTANT OF PURGING

FIG.5C

BEFORE SUBSEQUENT PURGING

HYDROGEN (FUEL) IS DIFFUSED AND EXHAUSTED SLOWLY BEFORE SUBSEQUENT PURGING

FIG.6

IMAGE OF EQUAL DILUTION
(TRANSITION OF HYDROGEN CONCENTRATION AT OUTLET OF DISCHARGED FUEL DILUTER)

FIG.7

HYDROGEN CONCENTRATION AT OUTLET OF DISCHARGED FUEL DILUTER WHEN EQUAL DILUTION IS CARRIED OUT

DISCHARGED FUEL DILUTER AND DISCHARGED FUEL DILUTION-TYPE FUEL CELL SYSTEM

FIELD OF THE INVENTION

The present invention relates to a discharged fuel diluter and a discharged fuel dilution-type fuel cell system, and more particularly to a discharged fuel diluter and a discharged fuel dilution-type fuel cell system, wherein hydrogen as a power source for an electric vehicle is processed during the purging operation of a fuel cell mounted on the electric vehicle.

BACKGROUND OF THE INVENTION

In the case that a fuel cell utilizes pure hydrogen (hereinafter referred to as hydrogen) as a power source of an electric vehicle (hereinafter referred to as a vehicle), hydrogen is supplied to the fuel cell in a hydrogen circulation system in order to improve the utilization efficiency (fuel economy). In this circulation system, an ejector for absorbing hydrogen while generating negative pressure, or a hydrogen pump is employed. Both ejector and hydrogen pump require purging. Herein, the term "purging" means to temporally discharge hydrogen in the circulation system to the outside.

Purging is required for the following reasons:
(1) To recover decreased cell voltage during a travel of the vehicle or during a stop of the vehicle with the motor idling.
(2) To adapt the anode to the cathode in accordance with a pressure change of the cathode, so that when the vehicle is stopped, an excessively increasing pressure difference between the cathode and the anode of the fuel cell can be prevented.

The purposes for recovering the cell voltage are as follows:
(1) With continuously circulating hydrogen, $N_2$ migrating from the cathode accumulates in the anode system, inhibiting the reaction. Therefore, it is necessary to discharge the accumulated $N_2$.
(2) Since condensed dewdrops of supplied water or produced water pools and causes flooding within the fuel cell, the output of the fuel cell lowers. Therefore, it is necessary to discharge the dewdrops to the outside of the system by increasing the flow velocity of the gas by way of purging.

In the conventional fuel cell system where hydrogen is used as a fuel for the fuel cell, high concentrations of hydrogen is released from purge piping. In another example, hydrogen is released after combustion processing with the use of a catalyst.

However, if there is an open fire or naked flame on a road, an instantaneous combustion such as after burn occurs just after releasing high concentrations of hydrogen from the vehicle. This is not preferable in terms of appearance.

Figure 9:
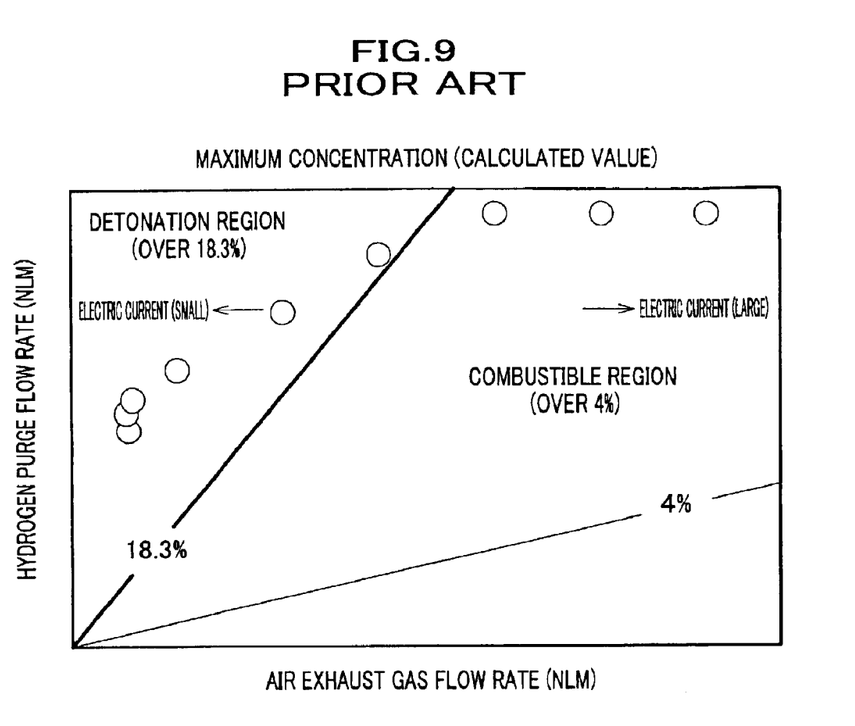
FIG. 9 is a graph showing the maximum concentration of hydrogen.

As shown in FIG. 9, the combustion characteristics of hydrogen when applying purging are such that hydrogen becomes highly combustible beyond the hydrogen concentration of 4% (percent by volume, hereinafter just referred to as %) and in a detonation region beyond the hydrogen concentration of 18.3% instantaneous and explosive combustion occurs.

Figure 10:
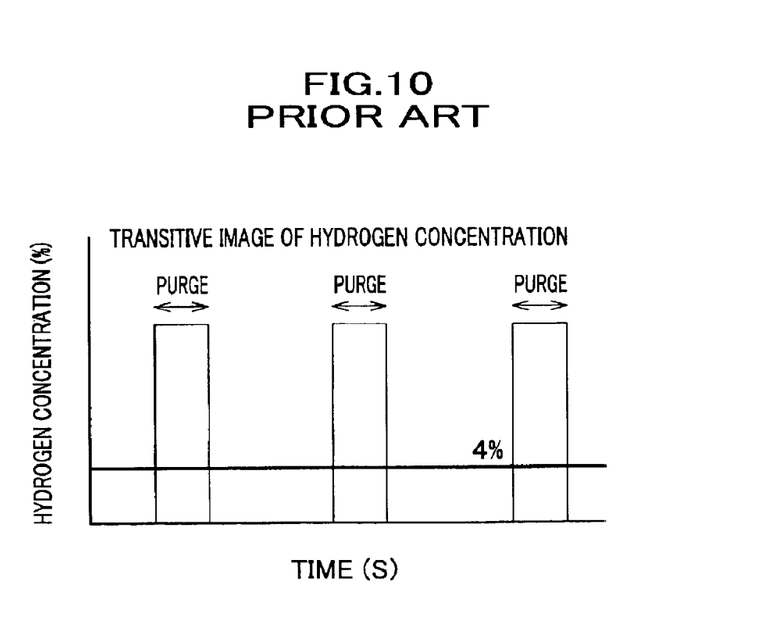
FIG. 10 is a graph showing transitive image of hydrogen concentration.

When hydrogen is catalytically processed, purging is carried out intermittently at a predetermined interval as illustrated in FIG. 10. Therefore, it is very difficult to retain the catalyst at sufficiently high temperatures and to mix with air, which makes the whole system complicated.

Accordingly, in view of the fact that purging is carried out intermittently, the purpose of the present invention is to dilute hydrogen below the lower combustible concentration limit of the fuel and exhaust it by taking as much time as possible between purging of the fuel within the fuel cell system and the subsequent purging.

SUMMARY OF THE INVENTION

According to a first aspect of the invention, there is provided a discharged fuel diluter comprising: a retention region with a predetermined volume, into which a fuel discharged from a fuel cell at the time of purging is retained; a dilution region with a predetermined volume, through which air discharged from the fuel cell flows and at which the air is mixed with the fuel from the retention region to dilute the fuel; and a communicating portion, through which the fuel flows from the retention region to the dilution region.

In this discharged fuel diluter, a fuel discharged from the fuel cell at the time of purging flows into the retention region and is retained temporally. This retained fuel is then mixed with air that is discharged from the fuel cell to the dilution region, and the diluted mixture is exhausted.

With this construction of the discharged fuel diluter, a fuel discharged from the fuel cell at the time of purging enters the retention region, and at a certain pressure flows through the communicating portion and into the dilution region, so that the fuel is mixed with air that is discharged from the fuel cell to the dilution region and the diluted mixture is exhausted. Therefore, since the fuel is diluted and exhausted below the lower combustible concentration limit, even if there is an open fire or naked flame, the exhaust gas does not catch fire.

In the aforementioned discharged fuel diluter, the retention region may be located above the dilution region.

In this discharged fuel diluter, if the fuel is a gas that is lighter than air, such as hydrogen, the fuel discharged from the fuel cell enters the retention region and stays there, and thereafter spreads within the whole retention region from top to bottom, and finally flows into the dilution region located below the retention region. Especially, if the communicating portion is formed by a porous plate such as ceramics, the fuel is less likely to flow through the communicating portion due to the flow resistance. Therefore, since the fuel is slowly mixed with the air within the dilution region, hydrogen is diluted below the lower combustible concentration limit without difficulties.

In the aforementioned discharged fuel diluter, a silencer may be integrally formed with the dilution region so as to reduce noise generated at a discharge of the air.

In this discharged fuel diluter, a silencer also functions as the discharged fuel diluter. Since a silencer comprises a plurality of porous plates each having a predetermined open area ratio and disposed at a predetermined pitch, it is preferable as the dilution region where dilution is carried out as much time as possible.

With this construction of the discharged fuel diluter, since the silencer also functions as the dilution region, the discharged fuel diluter requires less install space, thereby making the fuel cell system compact in size.

In the aforementioned discharged fuel diluter, a flame restriction means may be provided at the retention region and/or the dilution region.

In this discharged fuel diluter, even if the fuel discharged from the dilution region burns, the flame restriction means prevent(s) a flame from being transmitted to the retention region and/or the dilution region. This enables the discharged fuel diluter to be driven reliably.

In the aforementioned discharged fuel diluter, the communicating portion may be provided upstream of the retention region relative to a flow direction of the fuel.

In this discharged fuel diluter, the fuel discharged from the fuel cell flows in the retention region from its upstream to downstream and stays there for a while, and thereafter changes the flow direction from downstream to upstream so as to spread within the whole retention region, and finally flows into the dilution region from the communicating portion located at the upstream of the flow. Therefore, since the fuel is slowly mixed with the air within the dilution region, hydrogen is diluted below the lower combustible concentration limit without difficulties.

In the aforementioned discharged fuel diluter, the volume (s) of the retention region and/or the dilution region may be greater than the purge amount at the maximum output of the fuel cell.

In this discharged fuel diluter, even if the purge amount of the fuel becomes the maximum at the maximum output of the fuel cell, all the purged fuel can be retained in the retention region and then flows into the dilution region.

With this construction of the discharged fuel diluter, it is possible to dilute the fuel stably regardless of the purge amount and the dilution concentration does not disperse widely.

In the aforementioned discharged fuel diluter, a dilution concentration of the fuel may be set below a lower combustible concentration limit of the fuel.

In this discharged fuel diluter, since the fuel is diluted below the lower combustible concentration limit, the diluted fuel can be released from the fuel cell system without requiring a further processing. The diluted fuel is in no danger of combustion.

In the aforementioned discharged fuel diluter, a diameter of communication holes that form the communicating portion and an effective are of the communicating portion may be determined such that the fuel flowing from the retention region to the dilution region is diluted by taking as much time as possible between the purging and the subsequent purging.

In this discharged fuel diluter, the purged fuel that is discharged from the fuel cell and stays in the retention region slowly flows into the dilution region.

With this construction of the discharged fuel diluter, it is possible to dilute the fuel below the lower combustible concentration limit and the dilution concentration does not disperse widely.

According to a second aspect of the invention, there is provided a discharged fuel dilution-type fuel cell system comprising: a fuel cell, to which a fuel and air are supplied to generate electricity; a fuel circulation passage for mixing unreacted fuel discharged from the fuel cell with the fuel supplied to the fuel cell; a purging passage connected to the fuel circulation passage and temporally discharging the unreacted fuel from the fuel circulation passage; and any of the aforementioned discharged fuel diluter.

In this discharged fuel dilution-type fuel cell system, the fuel that is discharged from the fuel cell at the time of purging enters the discharged fuel diluter through the fuel circulation passage, and is mixed with air that is discharged from the cathode of the fuel cell. The mixed and diluted fuel is exhausted through the purging passage. Therefore, it is possible to dilute and exhaust the fuel below the lower combustible concentration limit, and even if there is an open fire or naked flam, the exhaust gas does not catch fire.

The aforementioned discharged fuel dilution-type fuel cell system may further comprise a bypass system which supplies air from an air compressor at the time of releasing purged fuel so as to compensate a shortage of the air.

In this discharged fuel dilution-type fuel cell system, even if the air discharged from the fuel cell is not sufficient, air that is used for diluting purged fuel is always supplied to compensate the shortage and to dilute the purged fuel. Therefore, a stable supply of the fuel and a constant dilution of the fuel can be achieved regardless of the shortage of the air discharged from the fuel cell. Herein, the term "bypass" indicates any passages, through which air can flow without entering the fuel cell.

BRIEF DESCRIPTION OF THE DRAWINGS

A preferred embodiment of the present invention will be described below, by way of example only, with reference to the accompanying drawings, in which.

DESCRIPTION OF THE PREFERRED EMBODIMENTS

With reference to the accompanying drawings, one preferred embodiment of a discharged fuel diluter according to the invention will be described.

Figure 1:
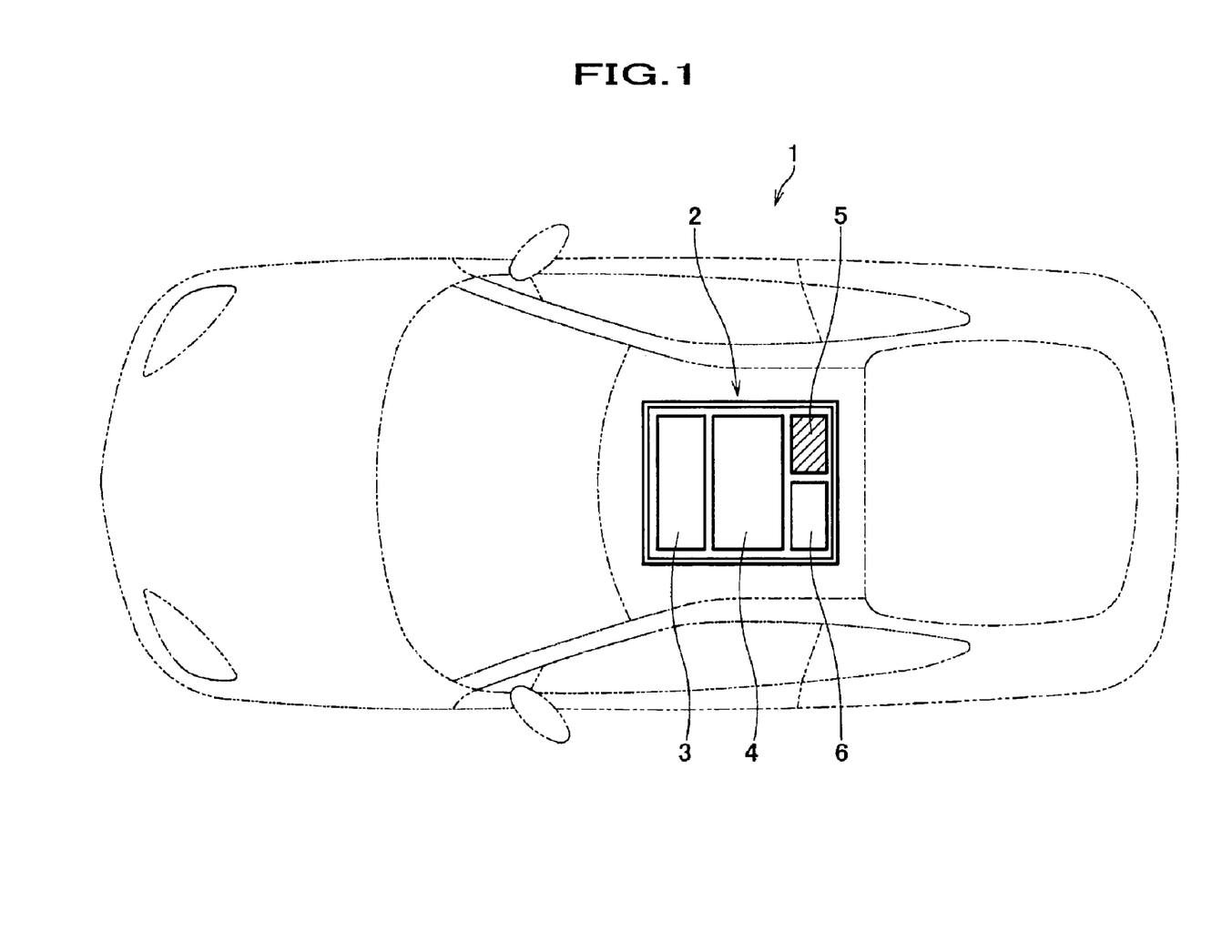
FIG. 1 is a view of a fuel cell-mounted electric vehicle illustrating the layout of a fuel cell system box including a discharged fuel diluter according to the invention.

As a drawing to be referred, FIG. 1 is a view of a fuel cell-mounted electric vehicle illustrating the layout of a fuel cell system box including a discharged fuel diluter according to the invention.

As seen in FIG. 1, a fuel cell system box 2 is mounted on a fuel cell-mounted electric vehicle (hereinafter referred to as a vehicle) 1 at a center of and under the floor of the vehicle 1. In the fuel cell system box 2, a temperature regulation means 3, a fuel cell 4, a discharged fuel diluter 5, and a humidifying means 6 are located in the order from the front to the rear of the vehicle 1. However, the discharged fuel diluter 5 and the humidifying means 6 are located parallelly. The fuel cell system also comprises a non-illustrated radiator, a non-illustrated high pressure hydrogen storage tank, etc.

The fuel cell 4 generates electricity by the reaction between pure hydrogen (hereinafter referred to as hydrogen)

as a fuel stored in the high pressure hydrogen storage tank and air from the outside of the vehicle 1, and supplies the electricity to drive the vehicle 1. In order to operate the fuel cell 4 properly, the temperature regulation means 3 controls the temperature of the fuel cell 4 and the humidifying means 6 humidifies hydrogen and air supplied to the fuel cell 4.

Figure 2:
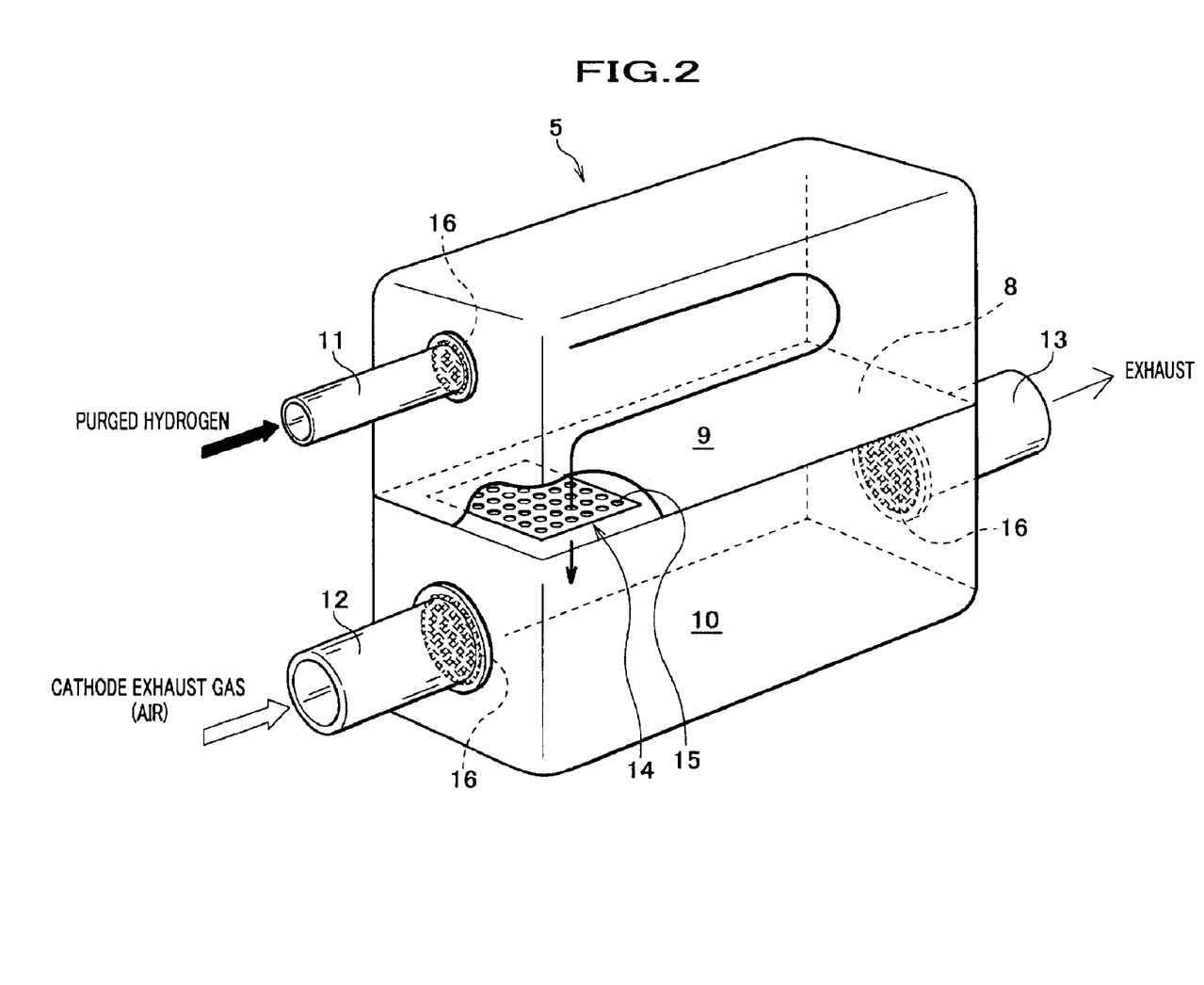
FIG. 2 is a partly broken away perspective view illustrating one embodiment of the discharged fuel diluter.

FIG. 2 is a partly broken away perspective view illustrating one embodiment of the discharged fuel diluter.

The discharged fuel diluter 5 is a box-like container, which is divided into upper and lower parts by a separation wall 8. The upper part defines a retention region 9, and the lower part defines a dilution region 10. When purging is carried out intermittently, hydrogen discharged from the fuel cell 4 flows through purged hydrogen piping 11 and stays in the retention region 9. Air discharged from the fuel cell 4 (FIG. 1) flows through a cathode exhaust gas (air) piping 12 and into the dilution region 10. Exhaust gas piping 13 is provided at the opposite side of the cathode exhaust gas piping 12 and downstream of the dilution region 10.

Provided in the retention region 9 at the upstream side along the flow direction of hydrogen is a communicating portion 14, through which the fuel flows from the retention region 9 to the dilution region 10. The communicating portion 14 includes a number of holes 15 over the entire surface thereof. Hydrogen that flows from the retention region 9 to the dilution region 10 through the holes 15 is mixed and diluted with air in the dilution region 10.

The communicating portion 14 is formed by a porous member, such as punching metal, porous ceramics, unglazed ceramics, etc. Punching metal is also called as perforated metal, and is produced by punching a metallic material. As a material for ceramics, alumina, silica, zirconia, titania, cordierite, mullite, zeolite, potassium titanate, apatite, silicon carbide, and silicon nitride are preferable.

Performance of these materials as the porous member which forms the communicating portion 14 is determined by the shape of the holes, the diameter of the holes, and the distribution of the holes. Of these, the diameter of the holes 15 and the effective area of the communicating portion 14 (area of the communicating portion 14 relative to the separation wall 8) are determined such that hydrogen flowing from the retention region 9 to the dilution region 10 is diluted by taking as much time as possible between one purging and another subsequent purging.

Hydrogen discharged from the fuel cell 4 (FIG. 1) at the time of purging flows through the purged hydrogen piping 11 and straightly within the retention region 9, and as illustrated by the arrow of FIG. 2, after the flow of hydrogen stops, the flow of hydrogen then changes its direction by 180 degrees and slowly flows through the communicating portion 14 located at the upstream side along the flow direction and into the dilution region 10 by taking as much time as possible. Since hydrogen flows slowly by taking as much time as possible, the hydrogen that has entered the dilution region 10 is slowly mixed and diluted with air that is discharged from the fuel cell 4 (FIG. 1) and flows through the cathode exhaust gas piping 12 into the dilution region 10. In this instance, the diameter of the holes 15 and the effective area of the communicating portion 14 are set such that the dilution concentration of hydrogen is below the lower combustible concentration limit of 4% (percent by volume, hereinafter just referred to as %). The hydrogen diluted below the lower combustible concentration limit (4%) is exhausted from the exhaust gas piping 13.

With decreasing effective area of the communicating portion 14, such as ½, ¼, and ⅛ of the whole area of the communicating portion 14, hydrogen flowing from the retention region 9 to the dilution region 10 is diluted more slowly by taking as much time as possible between the current purging and the subsequent purging.

As a flame restriction means, an after burn prevention filter 16 or a wire mesh filter is provided in the dilution region 10 at the inlet of the exhaust gas piping 13. Such an after burn prevention filter 16 is also provided at the outlet of the cathode exhaust gas piping 12 facing to the dilution region 10 and/or at the outlet of the purged hydrogen piping 11 facing to there tention region 9.

With provision of the after burn prevention filter 16, even if the diluted hydrogen exhausted from the exhaust gas piping 13 at the dilution region 10 burns, the fire will be extinguished and no flames transmit to the retention region 9 and/or the dilution region 10. Also, no flames transmit upward through the cathode exhaust gas piping 12 and/or the purged hydrogen piping 11.

Figure 3A:
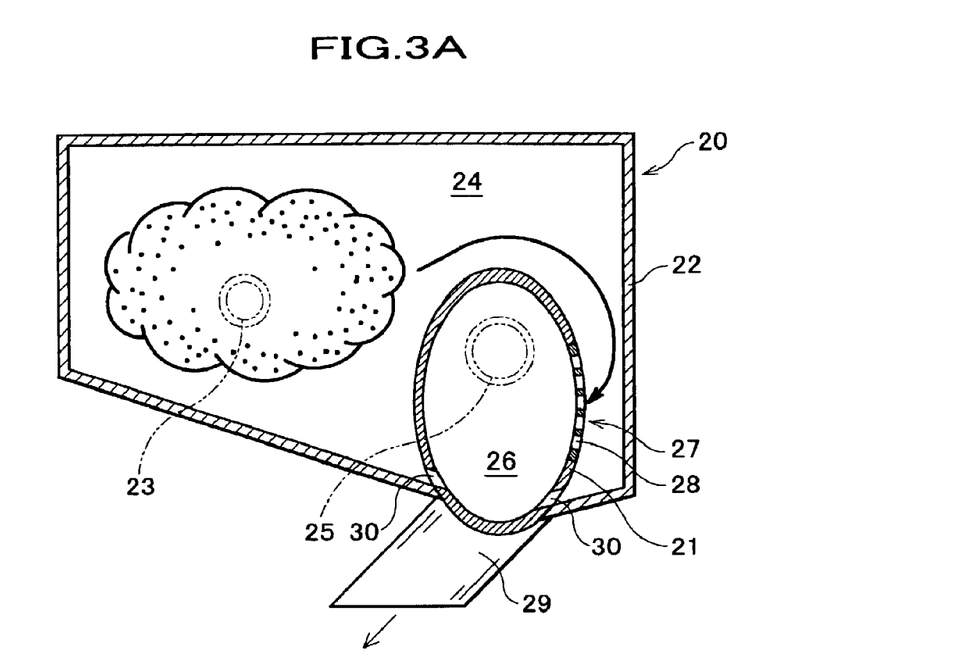
FIGS. 3A and 3B are sectional views illustrating another example of the discharged fuel diluter.
Figure 3B:
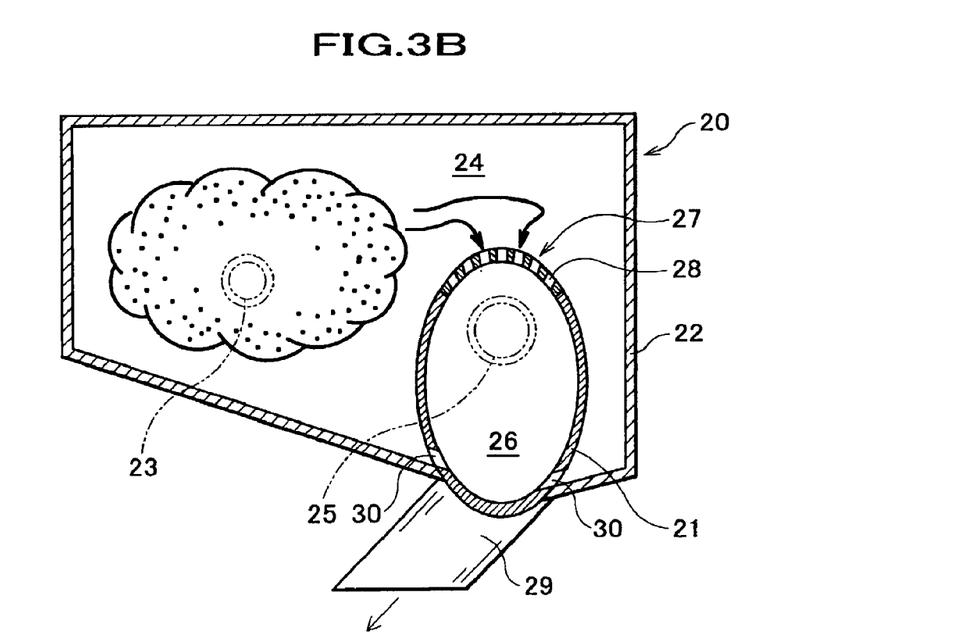

FIGS. 3A and 3B are sectional views illustrating another example of the discharged fuel diluter.

In this discharged fuel diluter 20, a hydrogen chamber 22 is formed to surround the periphery of a silencer 21. The hydrogen chamber 22 functions as a retention region 24 for hydrogen flowing from a purged hydrogen piping 23. The silencer 21, for example, comprises a plurality of porous plates each having a predetermined open area ratio and disposed at a predetermined pitch. The silencer 21 reduces noise generated upon discharging air from the fuel cell 4 (FIG. 1) through a cathode exhaust gas piping 25. The silencer 21 also functions as a dilution region 26 where hydrogen from the retention region 24 and air are mixed. Since the silencer 21 functions as the dilution region, the discharged fuel diluter 20 requires less install space, thereby making the fuel cell system compact in size. At a wall of the silencer 21 near the cathode exhaust gas piping 25, there is provided a communicating portion 27 formed by a plurality of holes 28. Further, at a wall of the hydrogen chamber 22 oppositely to the purged hydrogen piping 23 and the cathode exhaust gas piping 25, there is provided an exhaust gas piping 29.

Hydrogen discharged from the fuel cell 4 (FIG. 1) at the time of purging flows through the purged hydrogen piping 23 and straightly within the retention region 24, and as illustrated by the arrow of FIG. 3, slowly flows into the dilution region 26 defined within the silencer 21 through the communicating portion 27 by taking as much time as possible. Since hydrogen flows slowly by taking as much time as possible, the hydrogen that has entered the dilution region 26 is slowly mixed and diluted with air that is discharged from the fuel cell 4 (FIG. 1) and flows into the dilution region 26 through the cathode exhaust gas piping 25. The diluted hydrogen is then exhausted from the exhaust gas piping 29.

As shown in FIG. 3A, the communicating portion 27 is provided at a side of the dilution region 26. However, in accordance with diffusion characteristics or flow velocity of hydrogen, the communicating portion 27 may be provided at a top of the dilution region 26, as illustrated in FIG. 3B.

Hydrogen from the purged hydrogen piping 23 contains a lot of moisture, and dewdrops may be formed at the inner wall of the hydrogen chamber 22. However, dewdrops enter from side holes 30 of the dilution region 26 to the dilution region 26 and exhausted to the outside of the system together with air.

Figure 4:
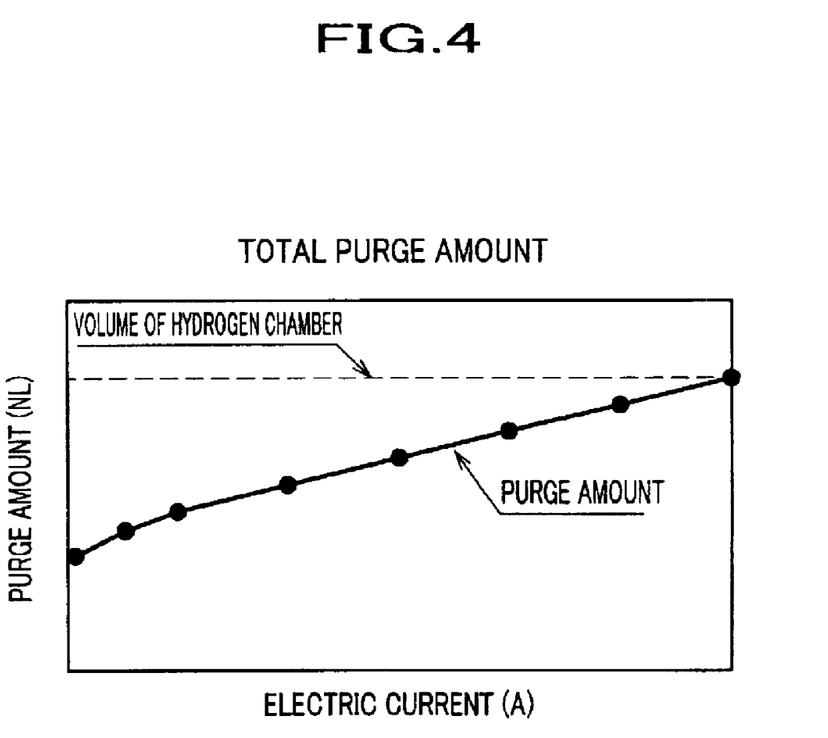
FIG. 4 is a graph showing the relation between the amount of purging and the volume of the hydrogen chamber.

FIG. 4 is a graph showing the relation between the amount of purging and the volume of the hydrogen chamber.

As seen in this figure, the volume of the dilution region 26 is set greater than the purge amount at the maximum output of the fuel cell 4 (FIG. 1) so as to take all purging into account. The volume of the retention region 24 is also set greater than the purge amount at the maximum output of the fuel cell 4 (FIG. 1) so as to take all purging into account.

Figure 5A:
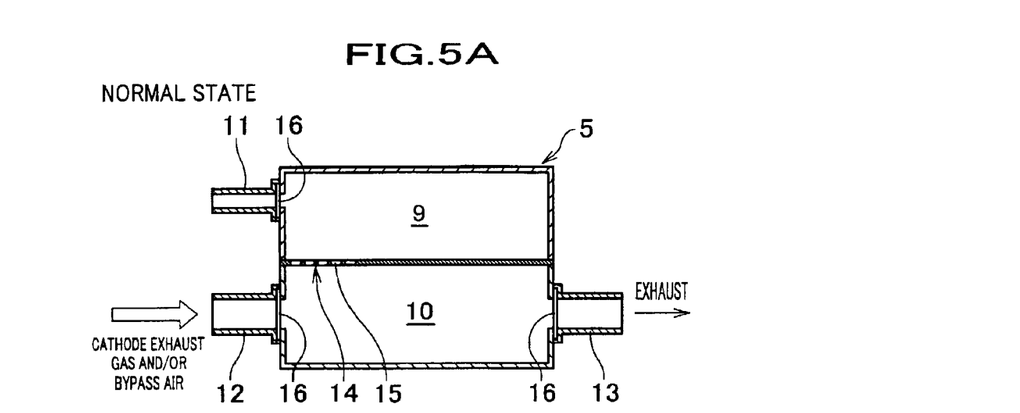
FIGS. 5A through 5C are views explaining the operations of the discharged fuel diluter.
Figure 5B:
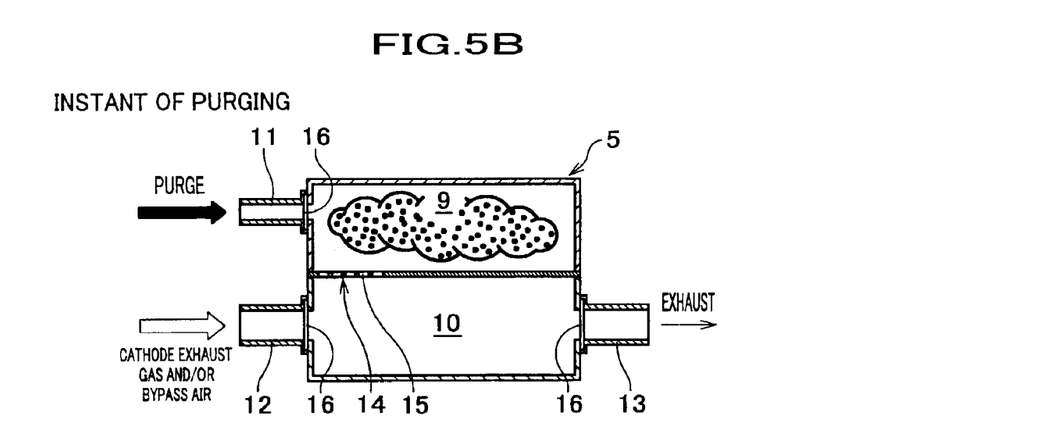
Figure 5C:
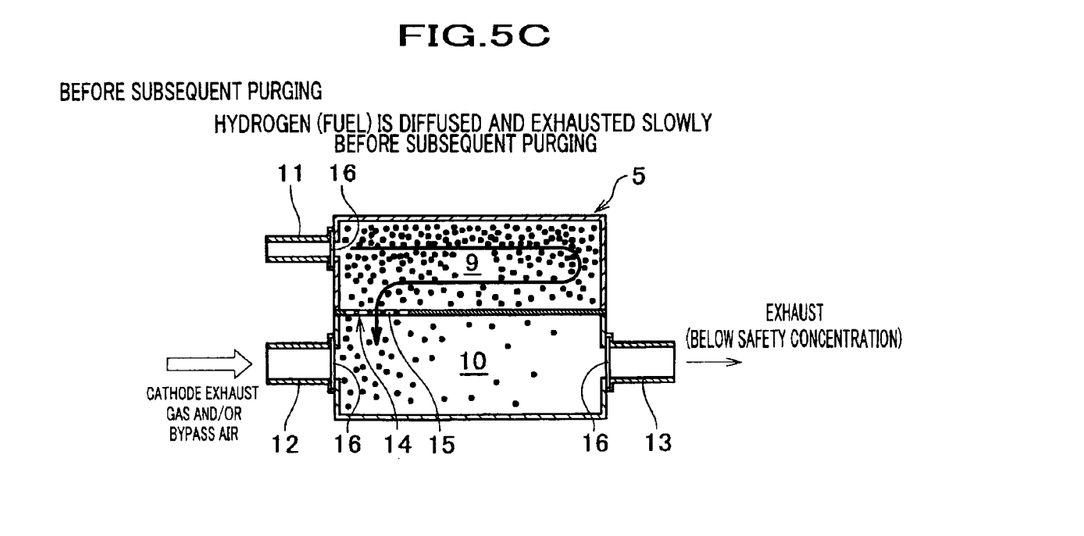

FIGS. 5A through 5C are views explaining the operations of the discharged fuel diluter.

FIG. 5A shows a normal state during a normal driving of the vehicle. In this instance, air discharged from the fuel cell 4 (FIG. 1) is exhausted from the exhaust gas piping 13 through the dilution region 10.

FIG. 5B shows an instant at which hydrogen is purged. Purging is carried out intermittently at a predetermined interval during the drive of the vehicle. Hydrogen discharged from the fuel cell 4 (FIG. 1) is retained in the retention region 9. When the hydrogen within the retention region 9 becomes greater than a predetermined pressure, the hydrogen is extruded and flows slowly and gradually from the holes 15 of the communicating portion 14 located at the upstream side of the flow of cathode exhaust gas into the dilution region 10. When doing so, air is discharged from the fuel cell 4 (FIG. 1) and is exhausted from the exhaust gas piping 13 through the dilution region 10.

FIG. 5C explains that hydrogen in the retention region 9 slowly diffuses through the communicating portion 14 and into the dilution region 10 between the current purging and the subsequent purging. Hydrogen is mixed with air within the dilution region 10 and is diluted below the lower combustible concentration limit (4%), which is a safety concentration for emission, and thereafter the diluted hydrogen is exhausted from the exhaust gas piping 13.

Figure 6:
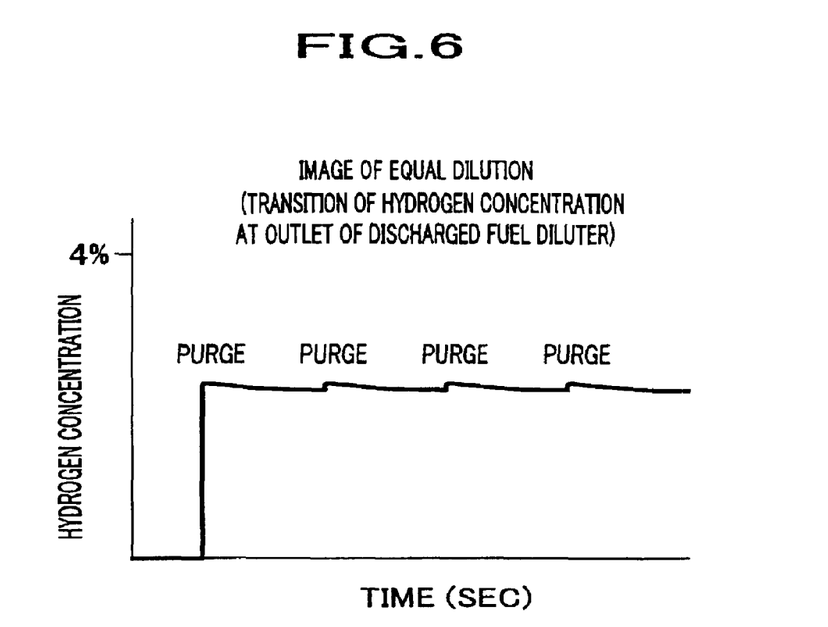
FIG. 6 is a view showing an image of an equal dilution.

FIG. 6 is a view showing an image of an equal dilution.

This figure shows the transition of concentration at the outlet of the exhaust gas piping 13 (FIG. 5) when the hydrogen that is diluted below the lower combustible concentration limit (4%) is exhausted from the exhaust gas piping 13. During the interval the hydrogen is exhausted continuously between one purging and another subsequent purging, the hydrogen is exhausted substantially at the same concentration.

As mentioned above, since purged hydrogen is once retained in the retention region and is diluted with air in the dilution region before the subsequent purging is carried out, the purged hydrogen is diluted below the lower combustible concentration limit (4%), which is a safety hydrogen concentration.

Figure 7:
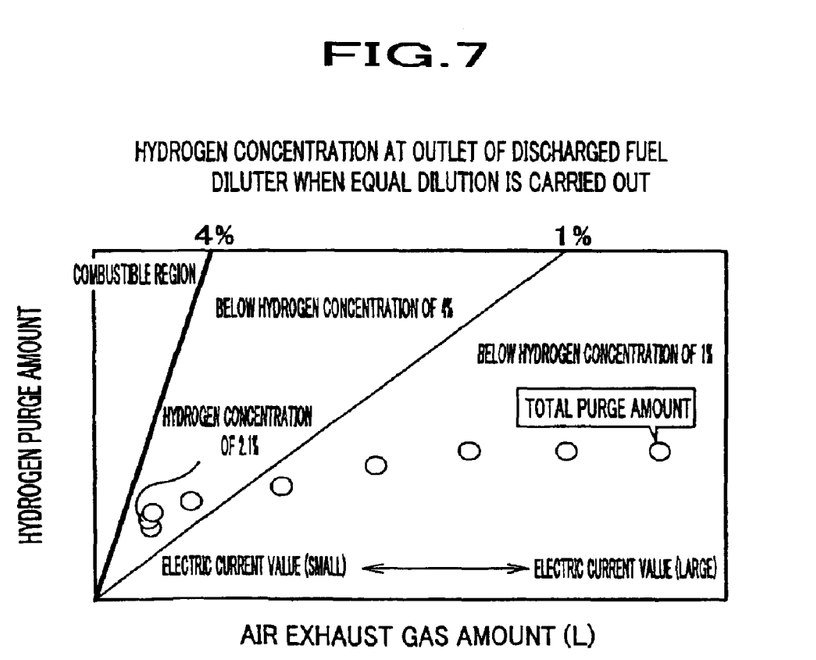
FIG. 7 is a graph showing concentration of hydrogen at the outlet of the discharged fuel diluter when the equal dilution is carried out.

FIG. 7 is a graph showing concentration of hydrogen at the outlet of the discharged fuel diluter when the equal dilution is carried out.

According to this figure, even if electric current generated by the fuel cell is, for example, the lowest current of 10A, the hydrogen concentration is about 2% that is lower than the lower combustible concentration limit of 4%. With increasing electric current further, the hydrogen concentration will be decreased below 1%.

Figure 8:
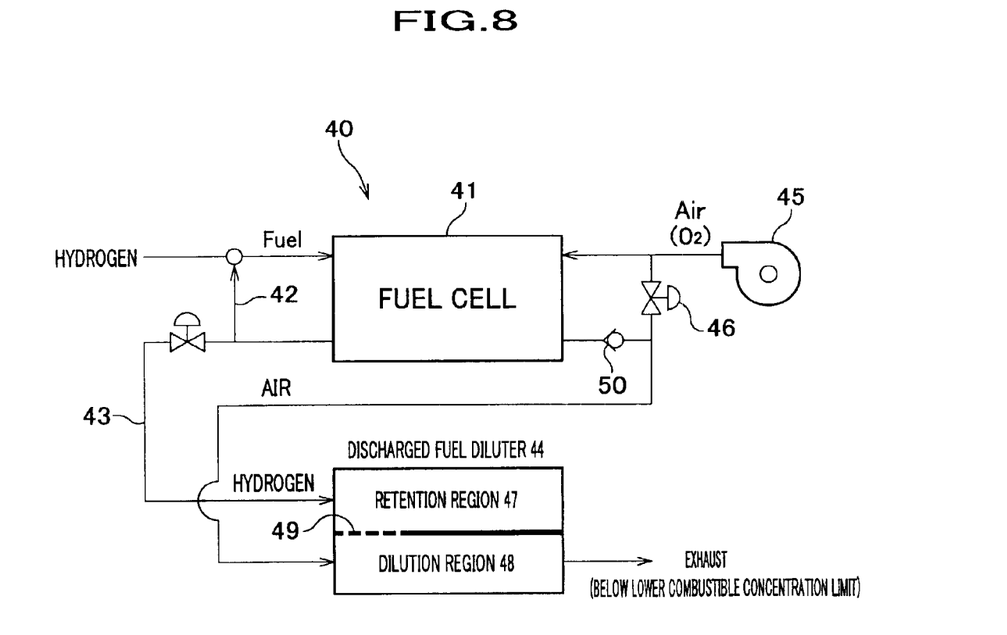
FIG. 8 is a block diagram illustrating a discharged fuel dilution-type fuel cell system according to the invention.

With reference to FIG. 8, a discharged fuel dilution-type fuel cell system according to the invention will be described.

This discharged fuel dilution-type fuel cell system 40 comprises: a fuel cell 41 to which a fuel and air are supplied to generate electricity; a fuel circulation passage 42 for mixing unreacted fuel discharged from the fuel cell 41 with a fuel supplied to the fuel cell 41; a purging passage 43 connected to the fuel circulation passage 42 and temporally discharging the unreacted hydrogen from the fuel circulation passage 42, and a discharged fuel diluter 44. The discharged fuel dilution-type fuel cell system 40 further comprises a bypass system which supplies air from an air compressor 45 (without passing through the fuel cell 41) during a discharge of purged hydrogen so as to compensate a shortage of air (oxygen). The bypass system is provided with a bypass valve 46 which is controlled to open and close at will. The reference numeral 50 indicates a one-way valve which ensures a discharge of air from the fuel cell 41 so as to prevent a counter flow of the air.

According to the discharged fuel dilution-type fuel cell system 40, purged hydrogen is discharged through the purging passage 43 and enters the retention region 47 of the discharged fuel diluter 44. Meanwhile, air discharged from the fuel cell 41 passes through the one-way valve 50 and flows into the dilution region 48 of the discharged fuel diluter 44 as a dilution gas. The hydrogen within the retention region 47 flows through the communicating portion 49 and enters the dilution region 48. The hydrogen is then mixed and diluted with air (oxygen) below the lower combustible concentration limit (4%), and thereafter the diluted hydrogen is exhausted. If the amount of air discharged from the fuel cell 41 is not sufficient as a dilution gas, air (oxygen) is supplemented from the air compressor 45 via the bypass valve 46.

While the invention has been described in detail with reference to specific embodiments thereof, it will be apparent to one skilled in the art that various changes and modifications may be made without departing from the scope of the claims.

What is claimed is:

1. A discharged fuel diluter comprising:
   a retention region with a predetermined volume, into which a fuel discharged from a fuel cell at the time of purging is retained;
   a dilution region with a predetermined volume, through which air discharged from the fuel cell flows and at which the air is mixed with the fuel from the retention region to dilute the fuel; and
   a communicating portion, through which the fuel flows from the retention region to the dilution region.

2. A discharged fuel diluter as claimed in claim 1, wherein said retention region is located above said dilution region.

3. A discharged fuel diluter as claimed in claim 1, wherein a silencer is integrally formed with said dilution region so as to reduce noise generated at a discharge of the air.

4. A discharged fuel diluter as claimed in claim 2, wherein a silencer is integrally formed with said dilution region so as to reduce noise generated at a discharge of the air.

5. A discharged fuel diluter as claimed in claim 1, wherein a flame restriction means is provided at said retention region and/or said dilution region.

6. A discharged fuel diluter as claimed in claim 2, wherein a flame restriction means is provided at said retention region and/or said dilution region.

7. A discharged fuel diluter as claimed in claim 1, wherein said communicating portion is provided upstream of the retention region relative to a flow direction of the fuel.

8. A discharged fuel diluter as claimed in claim 2, wherein said communicating portion is provided upstream of the retention region relative to a flow direction of the fuel.

9. A discharged fuel diluter as claimed in claim 1, wherein the volume of one of said retention region and said dilution region is greater than the purge amount at the maximum output of the fuel cell.

10. A discharged fuel diluter as claimed in claim 2, wherein the volume of one of said retention region and said dilution region is greater than the purge amount at the maximum output of the fuel cell.

11. A discharged fuel diluter as claimed in claim 1, wherein a dilution concentration of the fuel is set below a lower combustible concentration limit of the fuel.

12. A discharged fuel diluter as claimed in claim 2, wherein a dilution concentration of the fuel is set below a lower combustible concentration limit of the fuel.

13. A discharged fuel diluter as claimed in claim 1, wherein a diameter of communication holes that form the communicating portion and an effective are of the communicating portion are determined such that the fuel flowing from the retention region to the dilution region is diluted by taking as much time as possible between the purging and the subsequent purging.

14. A discharged fuel diluter as claimed in claim 2, wherein a diameter of communication holes that form the communicating portion and an effective are of the communicating portion are determined such that the fuel flowing from the retention region to the dilution region is diluted by taking as much time as possible between the purging and the subsequent purging.

15. A discharged fuel dilution-type fuel cell system comprising:
   a fuel cell, to which a fuel and air are supplied to generate electricity;
   a fuel circulation passage for mixing unreacted fuel discharged from the fuel cell with the fuel supplied to the fuel cell;
   a purging passage connected to the fuel circulation passage and temporally discharging the unreacted fuel from the fuel circulation passage; and
   a discharged fuel diluter as claimed in claim 1.

16. A discharged fuel dilution-type fuel cell system comprising:
   a fuel cell, to which a fuel and air are supplied to generate electricity;
   a fuel circulation passage for mixing unreacted fuel discharged from the fuel cell with the fuel supplied to the fuel cell;
   a purging passage connected to the fuel circulation passage and temporally discharging the unreacted fuel from the fuel circulation passage; and
   a discharged fuel diluter as claimed in claim 2.

17. A discharged fuel dilution-type fuel cell system as claimed in claim 15, further comprising a bypass system which supplies air from an air compressor at the time of releasing purged fuel so as to compensate a shortage of the air.

18. A discharged fuel dilution-type fuel cell system as claimed in claim 16, further comprising a bypass system which supplies air from an air compressor at the time of releasing purged fuel so as to compensate a shortage of the air.

19. A discharged fuel diluter as claimed in claim 1, wherein the retention region is a surrounded space.

20. A discharged fuel dilution-type fuel cell system as claimed in claim 15, wherein the retention region is a surrounded space.

21. A discharged fuel diluter as claimed in claim 1, further comprising:
   a divider element for dividing an interior of the diluter into the retention region and the dilution region.

* * * * *